United States Patent [19]

Glassman et al.

[11] 4,137,135
[45] Jan. 30, 1979

[54] PROCESS AND APPARATUS FOR SEPARATING LIGHT OIL FROM A MIXTURE COMPRISING WASTE OIL

[75] Inventors: Donald Glassman, Pittsburgh; Marc T. Rabbits, Jeannette, both of Pa.

[73] Assignee: United States Steel Corporation, Pittsburgh, Pa.

[21] Appl. No.: 678,836

[22] Filed: Apr. 21, 1976

[51] Int. Cl.$^2$ .......................... B01D 3/38; C07C 7/04; C10G 5/04
[52] U.S. Cl. .......................................... 203/87; 203/96; 208/341; 208/356; 260/674 R; 260/674 N
[58] Field of Search .................... 203/87, 39, 95–97, 203/92–94; 202/185 R, 186, 234; 23/294; 208/340, 341, 342, 356, 363; 260/674 R, 674 N

[56] References Cited

U.S. PATENT DOCUMENTS

| | | | |
|---|---|---|---|
| 1,560,137 | 11/1925 | Bernard | 208/341 |
| 2,472,810 | 6/1949 | Denig | 208/341 |
| 2,785,114 | 3/1957 | Schmalenbach | 203/96 |
| 2,922,751 | 1/1960 | Helm | 208/341 |

FOREIGN PATENT DOCUMENTS 750,011  8/1933  France .......................... 203/87

*Primary Examiner*—Wilbur L. Bascomb, Jr.
*Attorney, Agent, or Firm*—W. Gary Goodson

[57] ABSTRACT

The process of separating water and wash oil from a gaseous feed stream of water vapor, wash oil and light oil involving (a) directing the gaseous feed stream in an upward direction and in contact with a cooling solid surface such that a temperature gradient of the gaseous stream is produced such that the temperature of the gaseous stream is highest at the bottom of the cooling solid surface such that gaseous components of the gaseous stream having the highest boiling temperature condense onto the lower portions of the cooling solid surface and wherein the lower boiling components of the gaseous stream condense onto the solid surface at higher portions on the solid surface to thereby form a liquid film on the solid surface, which film then runs downward onto the lower portions of the solid surface to thereby inhibit deposits from adhering to these lower portions of the solid surface; (b) withdrawing a gaseous stream containing a major portion of light oil; and (c) withdrawing a liquid condensate which contains substantially all of the wash oil and a major portion of the water originally present in the gaseous stream. Preferably, a portion of the high boiling components of the light oil is also condensed on the cooling solid surface and then removed from the gaseous stream as part of the liquid condensate.

20 Claims, 2 Drawing Figures

PROCESS AND APPARATUS FOR SEPARATING LIGHT OIL FROM A MIXTURE COMPRISING WASTE OIL

BACKGROUND OF THE INVENTION

The most generally used method in the United States for removing light oil from coke oven gas is to use a petroleum wash oil to scrub the coke-oven gas of light oil. The wash oil is steam-distilled (debenzolized) to remove the light oil. The benzolized wash oil (wash oil rich in light oil) is introduced at the top of the still and flows down the column countercurrent to upward flow of live steam which is introduced in the base of the still column. The mixture of steam and light oil vapor exits at the top of the column. At this point it is necessary to remove the water and any wash oil which is still present in these vapors from the light oil. One method of accomplishing this which is used in industry is to introduce the vapor mixture at the base of a small-column partial condenser (dephlegmator). Cooling water is admitted at the top of the direct-contacting rectifying dephlegmator to cool and condense by direct contact with these vapors. By regulating the volume of water the temperature conditions are controlled. A fraction, consisting largely of wash oil and higher boiling light oil compounds such as naphtalene, is discharged at the bottom along with the water. This fraction is then separated from the water by decantation. The crude light oil vapors leaving the top of the rectifier are condensed and any water present is removed by decantation.

This method of removing wash oil and water from the light oil has serious disadvantages due to the sizable quantities of dirty water produced because of the direct water contact with the light-oil vapor in the direct-contacting dephlegmator. Substantial costs are required for treating this dirty water prior to re-use or disposal into streams or the like.

Attempts have been made to eliminate this waste water disposal problem by using an indirect partial condenser in place of the direct-contact partial condenser. However, this has not proved satisfactory because of serious fouling problems in the indirect partial condenser due to buildup of high boiling components as solids on the walls of the indirect partial condenser. Shutdowns and cleaning problems were believed to be sufficiently great to make this approach impractical.

SUMMARY OF THE INVENTION

Applicant's solution to this problem of separating the wash oil and water from the mixture of wash oil, light oil and water involves a special type of indirect partial condenser which avoids build-up of solids on the walls of the partial condenser and thereby eliminates fouling of the partial condenser with its associated shutdowns and cleaning problems. On the other hand, because the partial condenser used is an indirect partial condenser and hence no water or other cooling liquid directly contacts the mixture, the "dirty water" problem associated with the direct-contacting dephlegmator is almost completely eliminated.

The process of this invention achieves separation of water and wash oil from a gaseous feed stream of water vapor, wash oil and light oil by a process involving (a) directing the gaseous feed stream in an upward direction and in contact with the cooling solid surface such that a temperature gradient of the gaseous stream is produced such that the temperature of the gaseous stream is highest at the bottom of the cooling solid surface such that the gaseous components of the gaseous stream having the highest boiling temperature condense onto the lower portions of the cooling solid surface and wherein the lower boiling components of the gaseous stream condense onto said solid surface at higher portions on said solid surface to thereby form a liquid film on said solid surface which film then runs downward onto the lower portions of said solid surface to thereby inhibit solid deposits from adhering to these lower portions of said solid surface; (b) withdrawing a gaseous stream containing a major portion of the light oil; and (c) withdrawing a liquid condensate which contains substantially all of the wash oil and a major portion of the water. The cooling solid surface just mentioned is part of an indirect partial condenser which does not require any direct contact with any cooling liquid such as water.

In a preferred aspect of the process, a portion of the high boiling components of the light oil is also condensed onto the cooling solid surface and removed as part of the condensate from the gaseous feed stream. Many of these higher boiling materials are of the type which would condense out as solids and would form a build-up on the walls of the indirect partial condenser if it were not for the thin film of lower boiling materials which have condensed out higher up on the walls of the partial condenser to form a liquid film on the solid surface, which film then runs downward onto the lower portions of the solid surface. Preferably the indirect partial condenser of this invention is in a substantially vertical position. A preferred embodiment is a vertical knock-back condenser containing vertical tubes for passage of the gaseous feed stream therethrough and wherein the feed stream passes upward inside the tubes and the inside of a covering structure surrounding the tubes. A preferred vertical knock-back condenser is one similar to that described in Process Heat Transfer by D. Q. Kern, McGraw Hill, 1950, page 298, incorporated herein by reference.

Applicants' invention also includes apparatus for performing the above described process and comprising (a) means for directing the gaseous feed stream up through the above described indirect partial condenser, (b) means for withdrawing a gaseous stream containing a major portion of light oil and (c) means for withdrawing a liquid condensate which contains substantially all of the wash oil and a major portion of the water.

Applicants' invention also relates to a plant or facility for separating wash oil from a mixture of light oil and wash oil comprising a means for passing a wash oil containing preferably between about 0.5 and about 6 percent by weight of light oil based on the total weight of the mixture into a direct steam distillation tower and (b) a wash oil fraction which is withdrawn from the distillation tower to a decanter, and means for passing the gaseous mixture of steam and light oil through a partial condenser which separates substantially all of the remaining wash oil and a major portion of water vapor from the gaseous mixture of steam and light oil vapors, the improvement comprising using as the partial condenser the indirect partial condenser of this invention which was described above to thereby inhibit deposits from adhering to lower portions of the solid surface.

DESCRIPTION OF THE DRAWINGS AND PREFERRED EMBODIMENT(S)

The light oil of this invention is preferably obtained from coke oven gases and contains varying amounts of coal-gas products with boiling points from about 40° C. to 200° C. Benzene, toluene, xylene and solvent naphthas are the principle products recovered from this light oil. Naphthalene, indene and cumerone are common components of light oil. The light oil is generally a mixture of materials having varying boiling points from those of naphthalene to $C_5$ hydrocarbon materials. The high boiling materials will solidify and cause fouling as described previously. Water and small quantities of the low boiling materials such as xylene and benzene would condense higher on the indirect partial condenser of this invention and run down the tube to prevent the higher boiling materials from causing the fouling.

The wash oil of this invention is a material having the following characteristics: (1) good absorptive capacity for light oil in order to reduce distillation and pumping costs; (2) low vapor pressure and no appreciable quantity of low boiling material in order to reduce loss by vaporization in the scrubbers or still; (3) low viscosity in order to secure good distribution over the packing in the scrubber; (4) specific gravity materially different from water so that the two liquids can be separated in the decanters; (5) slight tendency to emulsify with water, which also facilitates rapid separation; (6) ability under conditions to which it is exposed so that it does not thicken, increase in molecular weight or resinify by reaction with constituents of the gas; (7) freedom from materials such as naphthalene, which could contaminate the gas; (8) low cost, and available in adequate quantities. A peferred wash oil generally used in American practice distills between about 250° and 400° C. Creosote fractions have also been used extensively in Europe as wash oils. Other solvents used occasionally or have been proposed as wash oils include anthracene oil, cresols and low-temperature tar oils.

A more thorough description of the characteristics of light oil and wash oil and the prior art techniques of recovering light oil from coke oven gases are described in Chapter 11 entitled "Light Oil" in "Coal, Coke and Coal Chemicals" by P. J. Wilson and J. H. Wells, McGraw Hill, 1950, at pp. 334–371, which description is incorporated herein by reference.

It will be understood that the light oil of this invention may also be obtained from low or high temperature carbonization of hydrocarbons in general, such as coal for uses other than making coke, petroleum or petroleum by-products, plant or animal hydrocarbons such as wood or wood products as well as from coke oven gases.

DESCRIPTION OF PREFERRED EMBODIMENT(S)

Figure 1:
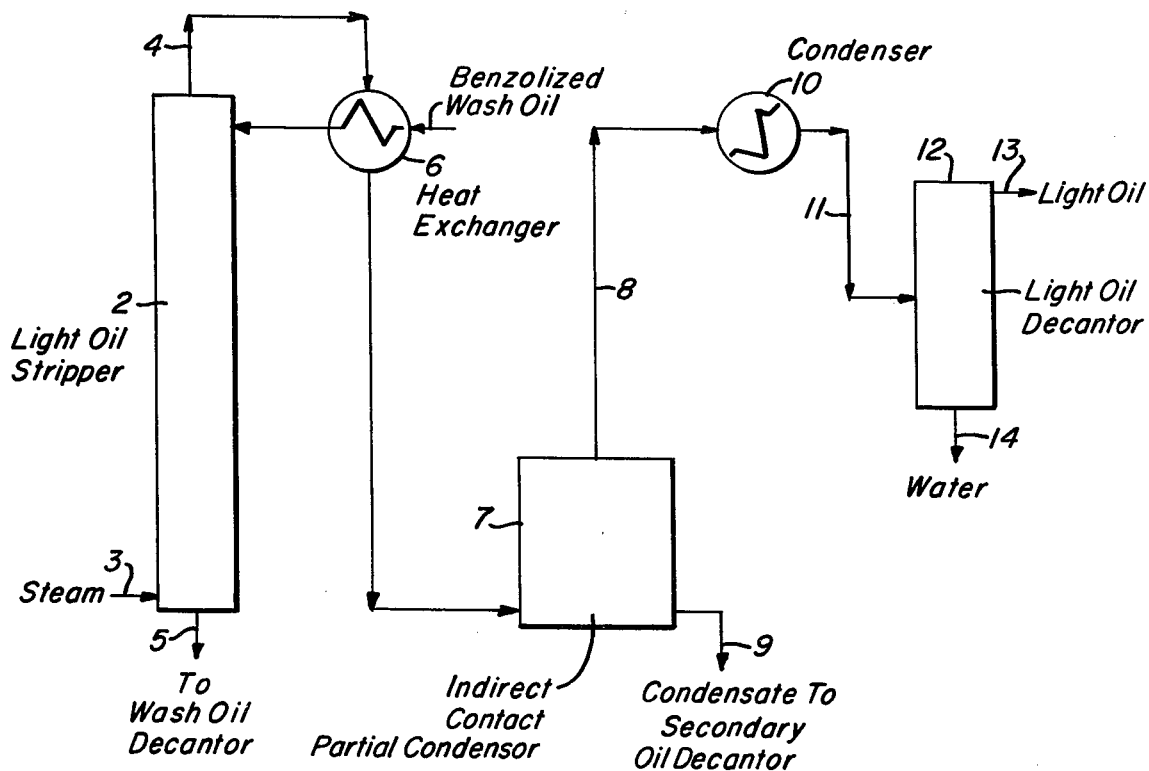
FIG. 1 is a flow diagram showing the process and apparatus for separating light oil from a mixture of wash oil and light oil and involving an indirect contact partial condenser of the type described above.

In FIG. 1 feed stream 1 carries benzolized wash oil (wash oil rich in light oil) into a light oil stripper 2 where most of the light oil and a small portion of wash oil and water vapor are removed as a gaseous stream through outlet 4. The benzolized wash oil in the feed stream 1 generally contains between about 0.5 and about 6 percent by weight of light oil based upon the total weight of benzolized wash oil. The light oil stripper 2 is preferably in the form of a countercurrent distillation column whereby the benzolized wash oil travels down through the column while steam from inlet 3 travels upward through the distillation column. The majority of the wash oil from the benzolized wash oil is removed through outlet 5 where it goes to a decanter for separating the wash oil and any light oil remaining from the water from the condensed steam. Preferably the exit stream 4 travels through a heat exchanger 6 to preheat the benzolized wash oil traveling through feed stream 1 so that the gaseous stream 4 containing wash oil, light oil and water vapor is preferably cooled down partially prior to entering indirect contact partial condenser 7 in the form described above such that the gaseous feed stream proceeds in an upward direction in contact with the cooling solid surface in order that the gaseous stream 8 is withdrawn from the indirect partial condenser 7, such gaseous stream 8 containing a major portion of the light oil from stream 4 and providing a liquid concentrate which is withdrawn through the stream 9 and which contains substantially all of the wash oil and a major portion of the water from gaseous stream 4. The condensate in stream 9 is then delivered to a secondary oil decanter for separating water and wash oil. Preferably the condensate in stream 9 contains a portion of the high boiling components of the light oil. When the gaseous feed stream 4 first contacts the cooling solid surface the cooling solid surface the temperature of the gaseous stream is preferably between about 212° and about 220° F. As the gaseous product stream leaves the cooling solid surface and indirect condenser 7 the stream is preferably at a temperature between about 180° and about 210° F. The cooling solid surface of indirect condenser 7 is preferably maintained at a temperature of between about 60° and about 150° F.

It will also be understood that the cooling solid surface may be of many varied shapes and compositions but it will be recognized that the composition, contour and position of this surface must be such that it will allow the lighter boiling components of the gaseous stream 4 to condense and form a thin film over the lower portions of the cooling solid surface to prevent higher boiling components of this gaseous feed stream 4 from fouling the indirect partial condenser 7 and building up solid material on the solid surface. It will also be recognized that the temperature of the solid surface and that of the gaseous stream 4 must be adjusted to accomplish the objective described herein for the indirect partial condenser 7. These various parameters relating to the indirect partial condenser 7 can readily be adjusted to vary the composition of the condensate which leaves through line 9 and the gaseous product stream which leaves through line 8. The gaseous product stream of line 8 is transferred to condenser 10 to form a liquid stream 11 which is transferred to light oil decanter 12 separates the remaining water to line 14 and the light oil is removed through line 13.

Figure 2:
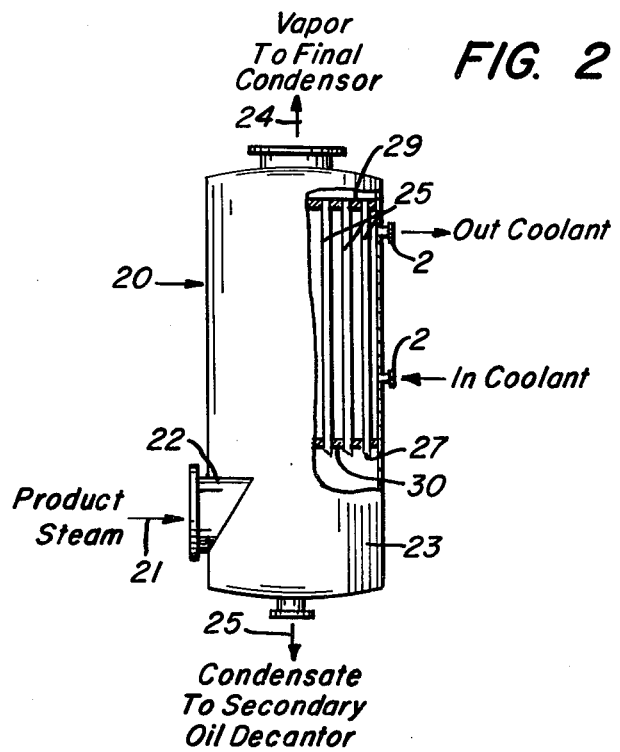
FIG. 2 is a detailed drawing of a vertical knock-back indirect partial condenser of the type useful in this invention.

FIG. 2 shows the detailed drawing of a preferred indirect contact partial condenser in the form of vertical knock-back condenser 20 which has an inlet product stream 21 which preferably has an inlet means 22 for assuring reasonably even distribution of the gaseous product stream throughout the bottom container portion 23 of the indirect condenser 20. A preferred inlet means 22 is a diagonally cut cylindrical inlet such that the top portion of the cylinder is further extended than the bottom portion such that at least part of the gaseous stream will be carried further into the container portion 23. The gaseous stream passes from storage portion 23 up through the inside of cylindrical or tubelike cooling means 26 which preferably have diagonally cut end means 28 to reduce the amount of liquid which is carried up the tubes with the gaseous product stream. The gaseous product stream 28 containing a major portion of the light oil is removed from the partial condenser 20 and transferred to a final condenser. A liquid condensate stream 25 containing substantially all the wash oil and a major part of the water is withdrawn and transferred to a secondary oil decanter. Inlet and outlet means 27 allow coolant to enter and leave the partial condenser 20 and preferably circulate around the outside of the tubes 26 and between the end means 29 and 30 of the indirect partial condenser 20. The coolant is preferably water.

The following example is given to help clarify applicants' invention. For simplicity, reference is made to FIG. 1 of the drawings. Benzolized wash oil is introduced to heat exchanger 6 through feed stream 1. The benzolized wash oil is introduced at a rate of 218,000 pounds per hour of which 2,750 pounds per hour (pph) is light oil. The temperature of the benzolized wash oil is between about 59° and about 86° F. The benzolized wash oil leaves heat exchanger 6 at a temperature between about 158° and about 194° F., and is then introduced into light oil stripper 2. Steam is introduced to the light oil stripper 2 through line 3 at a pressure of between about 6 and about 8 psig and at a rate of about 30,000 pph into light oil stripper 2. The majority of the wash oil from the benzolized wash oil is removed through outlet 5 at a temperature between about 226° and about 230° F. and at a rate of about 227,350 pph before it goes to a decanter for separating the wash oil and any light oil remaining from the water from the condensed steam. The exit product stream 4 is at a temperature of from about 212° to about 225° F. and at a rate of about 23,400 pph. This product stream passes through the heat exchanger where it transfers the heat to the benzolized wash oil traveling through feed stream 1. The heat exchanger 6 is a tubular vapor to oil heat exchanger which acts as a partial condenser. The temperature of the product stream 4 after it leaves the heat exchanger is at a temperature of between about 212° and about 220° F. About 15,320 pph of the product stream 4 remains in the gaseous form and enters into indirect contact partial condenser 7. About 8,080 pph of the product stream leaving the heat exchanger is in a liquid form and is transferred directly to the condensate stream 9 leaving the indirect partial condenser 7. The gaseous product stream entering the indirect partial condenser 7 has a composition as follows:

|  | (% by weight) Preferred Value | Range |
| --- | --- | --- |
| Water | 75% | 70–80% |
| Benzene | 15% | 10–20% |
| Toluene | 4% | 2–5% |
| Ethylbenzene | <1% | 0–1% |
| Xylenes | 1% | 0.5–2% |
| Styrene | <1% | 0–1% |
| Naphthalene | 4% | 1–5% |
| Coumarone Indene | 1% | 1–5% |

-continued

|  | (% by weight) Preferred Value | Range |
| --- | --- | --- |
| Wash Oil | <1% | 0–1% |

The cooling water circulating through the indirect partial condenser (in a form as shown in FIG. 2) has a preferred temperature of between about 80° and about 100° F. but may range between about 60° and about 100° F. The cooling water is circulated through the condenser at a rate of 1352 gallons per minute. The condensate stream leaving through line 9 leaves at a rate of about 19,920 pph and is then sent to a decanter to separate the wash oil and light oil from any water present. The product stream in gaseous form leaves the indirect partial condenser 7 through line 8 in gaseous form at a temperature between about 180° and about 210° F. and preferably at a temperature of about 183° F. and at a rate of about 3,480 pounds per hour. The product stream consisting essentially of gaseous light oil and water vapor is transferred to condenser 10 and then to decanter 12 where the light oil is separated from the water. The composition of the condensate leaving through line 9 from the indirect partial condenser is as follows:

|  |  | (% by weight) Preferred Value | Range |
| --- | --- | --- | --- |
| Water |  | 92% | 85–98% |
| Naphthalene |  | 5% | 1–8% |
| Coumarone Indene |  | 1% | 0–2% |
| Lower Boiling Fraction | (benzene toluene xylenes, etc) | 1% | 0–2% |
| Wash Oil |  | 1% | 0–2% |

The composition of the gaseous product stream leaving indirect partial condenser 7 through line 8 is as follows:

|  | (% by weight) Preferred Value | Range |
| --- | --- | --- |
| Water | 2% | 0–5% |
| Benzene | 70% | 65–75% |
| Toluene | 17% | 15–20% |
| Ethylbenzene | 1% | 0–1% |
| Xylenes | 5% | 3–8% |
| Styrene | 1% | 0–2% |
| Naphthalene | 3% | 1–5% |
| Coumarone Indene | 1% | 0–2% |

We claim:

1. A process of separating water and wash oil from a gaseous feed stream of water vapor, wash oil and light oil comprising (a) directing the gaseous feed stream in an upward direction and in contact with a cooling solid surface in the form of a vertical knock-back condenser containing vertical tubes for passage of the gaseous feedstream upward through the inside of these tubes such that a temperature gradient of the gaseous stream is produced such that the temperature of the gaseous stream is highest at the bottom of the cooling solid surface such that gaseous components of the gaseous stream having the highest boiling temperature condense onto the lower portions of the cooling solid surface and wherein the lower boiling components of the gaseous stream condense onto said solid surface at higher portions on said solid surface to thereby form a liquid film on said solid surface which film then runs downward onto the lower portions of said solid surface to thereby inhibit deposits from adhering to these lower portions of said solid surface; (b) withdrawing a gaseous stream containing a major portion of the light oil; and (c) withdrawing a liquid condensate which contains substantially all of the wash oil and a major portion of the water.

2. Process as in claim 1 wherein a portion of the high boiling components of the light oil is also condensed on the cooling solid surface and removed from the gaseous feed stream.

3. Process as in claim 2 wherein the high boiling components are naphthalene, coumarone, indene or mixtures thereof.

4. Process as in claim 1 whereby cooling water passes on the outside surface of the tubes and inside of a covering structure surrounding the tubes.

5. Process as in claim 1 wherein the tubes have diagonally cut open ends opening into an enclosed storage space for the gases of the gaseous feed stream.

6. Process as in claim 1 wherein the temperature of the gaseous feed stream as it first contacts the cooling solid surface is between about 212° and about 220° F.

7. Process as in claim 6 wherein the temperature of the gaseous product stream as it leaves the cooling solid surface is between about 180° and about 210° F.

8. Process as in claim 4 wherein the temperature of the gaseous feed stream as it first contacts the cooling solid surface is between about 212° and about 220° F.

9. Process as in claim 8 wherein the temperature of the gaseous product stream as it leaves the cooling solid surface is between about 180° and about 210° F.

10. Process as in claim 9 wherein the cooling solid surface is maintained at a temperature of between about 60° and about 150° F.

11. Process as in claim 1 wherein the gaseous stream leaving the cooling solid surface is passed to a condenser and then to a decanter where the light oil is separated from any remaining water, and wherein the liquid condensate leaving the cooling solid surface is collected and sent to a decanter to separate the water from the wash oil and any light oil present in the condensate.

12. Process of separating water, wash oil and a portion of the higher boiling components of the light oil from a gaseous feed stream of water vapor, wash oil and light oil comprising (a) directing the gaseous feed stream in an upward direction and in contact with an indirect partial condenser containing a cooling solid surface in the form of vertical tubes which allow the gaseous stream to pass upward inside the tubes and wherein the temperature of the cooling solid surface and configuration of the indirect partial condenser are such that a temperature gradient of the gaseous stream is produced such that the temperature of the gaseous stream is higher at the bottom of the cooling solid surface such that the gaseous components of the gaseous stream having the highest boiling temperature condense onto the bottom of the smooth solid surface and wherein the lower boiling components of the gaseous stream condense onto said solid surface at a higher position on the said solid surface to thereby form a liquid film on said solid surface which film then runs downward onto the lower portions of said solid surface to thereby inhibit deposits from adhering to the lower portions of said solid surface; (b) withdrawing a gaseous product stream containing a major portion of the light oil; and (c) withdrawing a liquid condensate which contains substantially all of the wash oil and a major portion of the water and a portion of the higher boiling components of the light oil and wherein the temperature of the gaseous feed stream as it first contacts the cooling solid surface is between about 212° and about 220° F. and wherein the temperature of the gaseous product stream as it leaves the cooling solid surface is between about 180° and about 210° F. and wherein the cooling solid surface is maintained at a temperature of between about 60° and about 150° F.

13. Process as in claim 12 wherein the gaseous feed stream initially contacting the cooling solid surface has the following composition percent by weight: water 70–80, benzene 10–20, toluene 2–5, ethylbenzene 0–1, xylenes 0.5–2, styrene 0–1, napthalene 1–5, coumarone and indene 1–5, wash oil 0–1, and wherein the liquid condensate has the following composition in percent by weight: water 85–98, napthalene 1–8, coumarone and indene 0–2, benzene, toluene, xylene and miscellaneous light oils 0–2, wash oil 0–2 and wherein the gaseous product stream leaving the indirect partial condenser has the following composition in percent by weight: water 0–5, benzene 65–75, toluene 15–20, ethylbenzene 0–1, xylenes 3–8, styrene 0–2, napthalene 1–5, coumarone and indene 0–2.

14. In a process of separating wash oil from light oil comprising passing a wash oil derived from coke oven gas containing between about 0.5 percent and about 6 percent by weight of light oil into a direct steam distillation tower to produce (a) a gaseous mixture of steam and light oil vapor which is withdrawn from the top of the steam distillation tower and (b) a wash oil fraction is withdrawn from the distillation tower to a decanter, and wherein the gaseous mixture of steam and light oil vapor is passed through a partial condenser which separates substantially all of the remaining wash oil and a major portion of the water from the gaseous mixture of steam and light oil vapors, the improvement comprising using as the partial condenser an indirect partial condenser whereby the mixture of steam and light oil vapor passes in an upward direction and in contact with a cooling solid surface in the form of a vertical knockback condenser containing vertical tubes for passage of the gaseous feedstream upward through the inside of these tubes such that a temperature gradient of the mixture of steam and light oil vapor is produced such that the temperature of this mixture is highest at the bottom of the cooling solid surface such that the gaseous components of the mixture having the highest boiling temperature condense onto the bottom of the cooling solid surface and wherein the lower boiling components of the gaseous stream condense onto said solid surface at a higher position on said solid surface to thereby form a liquid film on said solid surface which film then runs downward onto the lower portions of said solid surface to thereby inhibit deposits from adhering to the lower portions of said solid surface.

15. Process as in claim 14 wherein a portion of the high boiling components of the light oil is also condensed on the cooling solid surface and removed from the gaseous feed stream.

16. Process as in claim 15 wherein the high boiling components are napthalene, coumarone, indene or mixtures thereof.

17. Process as in claim 16 whereby cooling water passes upward on the outside surface of the tubes and inside of a covering structure surrounding the tubes.

18. Process as in claim 16 wherein the tubes have diagonally cut open ends opening into an enclosed storage space for the gases of the gaseous feed stream.

19. Process as in claim 14 wherein the temperature of the gaseous feed stream as it first contacts the cooling solid surface is between about 212° and about 220° F.

20. Process as in claim 14 wherein the gaseous feed stream initially contacting the cooling solid surface has the following composition percent by weight: water 70–80, benzene 10–20, toluene 2–5, ethylbenzene 0–1, xylenes 0.5–2, styrene 0–1, napthalene 1–5, coumarone and indene 1–5, wash oil 0–1, and wherein the liquid condensate has the following composition in percent by weight: water 85–98, napthalene 1–8, coumarone and indene 0–2, benzene, toluene, xylene and miscellaneous light oils 0–2, wash oil 0–2 and wherein the gaseous product stream leaving the indirect partial condenser has the following composition in percent by weight: water 0–5, benzene 65–75, toluene 15–20, ethylbenzene 0–1, xylenes 3–8, styrene 0–2, napthalene 1–5, coumarone and indene 0–2.

* * * * *

UNITED STATES PATENT AND TRADEMARK OFFICE
CERTIFICATE OF CORRECTION

PATENT NO. : 4,137,135

DATED : January 30, 1979

INVENTOR(S) : Donald Glassman and Marc T. Rabbits

It is certified that error appears in the above-identified patent and that said Letters Patent are hereby corrected as shown below:

Column 9, line 1, Claim 17, change "16" to -- 14 --.

Column 9, line 4, Claim 18, change "16" to -- 14 --.

Signed and Sealed this

Eighth Day of May 1979

[SEAL]

Attest:

RUTH C. MASON
*Attesting Officer*

DONALD W. BANNER
*Commissioner of Patents and Trademarks*